United States Patent [19]

Kamiya

[11] 4,102,379
[45] Jul. 25, 1978

[54] STRUCTURE OF SEALING SPLIT RIM TYPE WHEELS

[75] Inventor: Tadashi Kamiya, Nieza, Japan

[73] Assignee: Honda Giken Kogyo Kabushiki Kaisha, Tokyo, Japan

[21] Appl. No.: 725,954

[22] Filed: Sep. 23, 1976

[30] Foreign Application Priority Data

Oct. 3, 1975 [JP] Japan .............................. 50-134704[U]

[51] Int. Cl.$^2$ .............................................. B60B 25/00
[52] U.S. Cl. .................................... 152/405; 152/404; 152/DIG. 10
[58] Field of Search .............. 301/10 R, 11 CD, 11 S, 301/11 KL, 35, 63 DD, 63 DT, 63 DS, 63 D; 152/DIG. 10, 404, 405, 402, 396, 379

[56] References Cited

U.S. PATENT DOCUMENTS

| 551,967 | 1/1958 | Antonson | 152/DIG. 10 |
| 768,047 | 8/1904 | Heitger | 301/63 D |
| 2,998,282 | 8/1961 | Moyer | 301/63 DS |
| 3,880,219 | 4/1975 | Mitchell | 152/DIG. 10 |

FOREIGN PATENT DOCUMENTS

103,369  3/1938  Australia .......................... 301/63 DS

Primary Examiner—Robert B. Reeves
Assistant Examiner—H. Grant Skaggs
Attorney, Agent, or Firm—Irving M. Weiner

[57] ABSTRACT

A pair of split rim members are secured to the outer periphery of a wheel disc, and are provided with at least one projection piece which forms a space between it and the outer periphery of the wheel disc. An elastic sealing ring is inserted in such space to maintain airtightness, with the sealing ring having a normal width which is greater than the width of such space.

4 Claims, 5 Drawing Figures

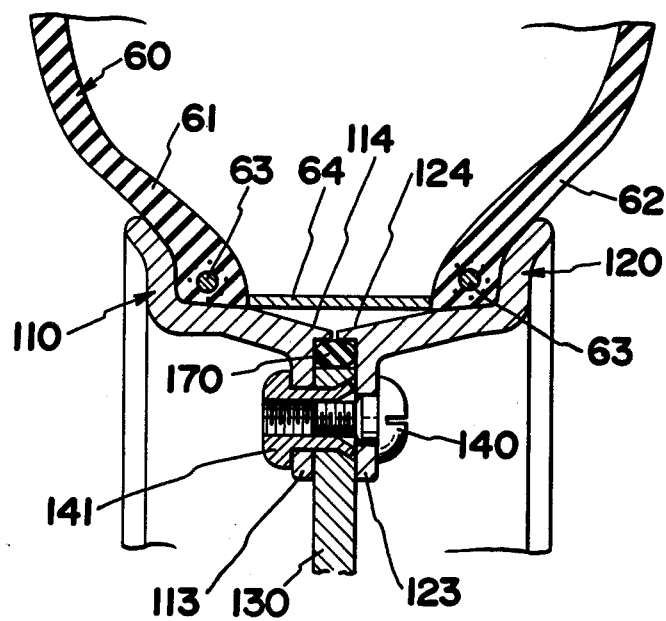
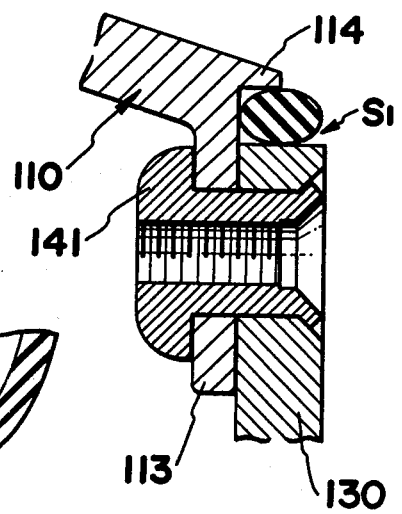
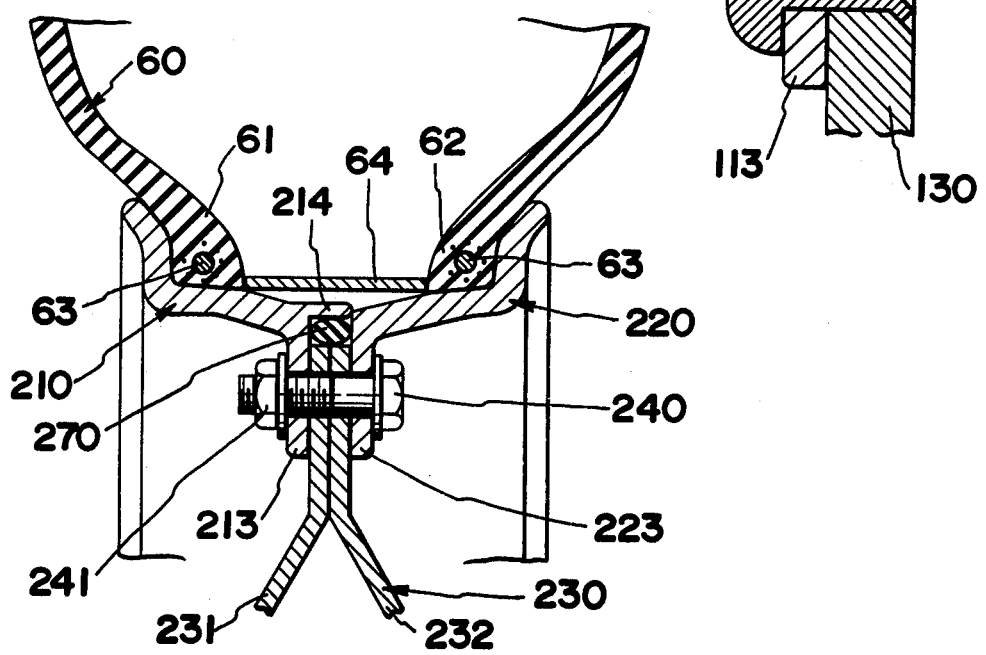

STRUCTURE OF SEALING SPLIT RIM TYPE WHEELS

The present invention relates generally to structures of sealing split rim type wheels using tubeless tires.

More particularly, the present invention relates to a sealing structure wherein a rim is of a split type, a space is formed between the outer peripheral edge of a disc and the opposed part of a rim in assembling the rim to the disc, and a sealing member is interposed in this space so as to maintain the airtightness of a tubeless tire to be fitted to the outer periphery of the rim.

BACKGROUND OF THE INVENTION

Heretofore, when a rim was of a split type, and a tubeless tire was to be fitted to the rim made by integrally connecting together the split rim members, a sealing member would be interposed in sealing the tire and rim to maintain the airtightness between them. A groove for inserting the sealing member is required for the wheel rim using such tubeless tire. Such groove has heretofore been shaped by such mechanical operations as cutting, pressing, shaping or casting.

In shaping such groove for inserting the sealing member, in case the diameter is comparatively small as in the wheels of automobiles, there will be no serious problem. But in case a wheel of a large diameter as in autobicycles or motorcycles is of a split rim type and is worked by cutting or the like to adopt a tubeless tire, in order to obtain precision many steps and troubles will be required for manufacture, the operations will be troublesome and complicated, the productivity will be very low, and the cost will be high. Further, in the pressing molding or the like, an extraction gradient will be required in shaping. Therefore, the groove will be tapered and the sealing member will not be seated properly, will therefore require great care in being inserted, will drop in the assembling work, and will not be adaptable to mass-production.

SUMMARY OF THE INVENTION

In view of the problems in working and assembling sealing means in case the wheel is of a large diameter as in conventional cars and particularly autobicycles or motorcycles, and a split rim type and tubeless tire is employed, the present invention is made to effectively solve such problems.

An object of the present invention is to provide a sealing structure wherein a wheel disc and rim are of a split type, the rim is split on the right and left into two rim members, a space is formed between the butting part of the split rim members and the outer peripheral edge of the disc in butting the split rim members together and assembling them on the peripheral part of the disc, a sealing member is interposed in this space and is pressed in contact with the inside wall of the space by assembling the split rim members so as to maintain the airtightness of the tire space formed on the outer periphery of the rim.

Another object of the present invention is to provide a sealing structure wherein a special groove for inserting a sealing member need not be formed. Therefore the structure of a rim in a wheel of a split type using a tubeless tire is simplified and is made easy to manufacture.

A further object of the present invention is to provide a sealing structure which requires no special work in providing a sealing member and forcibly fitting it in a groove, can be simply fitted in the work of assembling a split rim and disc, simplifies the assembly of a wheel including the assembly of a sealing member, makes the work easy, contributes to improvement of workability and is adaptable to the mass-production of wheels.

A still further object of the present invention is to provide a sealing structure wherein, because a sealing member is inserted in a space formed between the outer peripheral edge part of a disc and the butting part of the rim assembled to it, the sealing member will be held positively. Further, when the rim is assembled to the disc, the sealing member will be compressed to be elastically deformed so as to be pressed in contact with the inside wall of the space to increase the sealability, even if the internal pressure of the tubeless tire is high. The airtightness will be maintained positively enough and the sealability will be high and, because the sealing member is not interposed on the jointing surface of the rim and disc, a sufficient rim assembling fastening force will be obtained.

Preferred embodiments of the present invention shall be explained below in detail with reference to the accompanying drawings.

BRIEF DESCRIPTION OF THE DRAWINGS

FIG. 3 is a view similar to FIG. 1 of a second embodiment wherein the connecting member is modified, and the members forming the space for inserting the sealing member are modified.

FIG. 4 is a magnified view of the essential parts of FIG. 3 wherein one split rim member is assembled with the disc.

FIG. 5 is a view similar to FIG. 1 of a third embodiment applied to a disc of a split type.

DETAILED DESCRIPTION OF THE PREFERRED EMBODIMENTS

Figure 1:
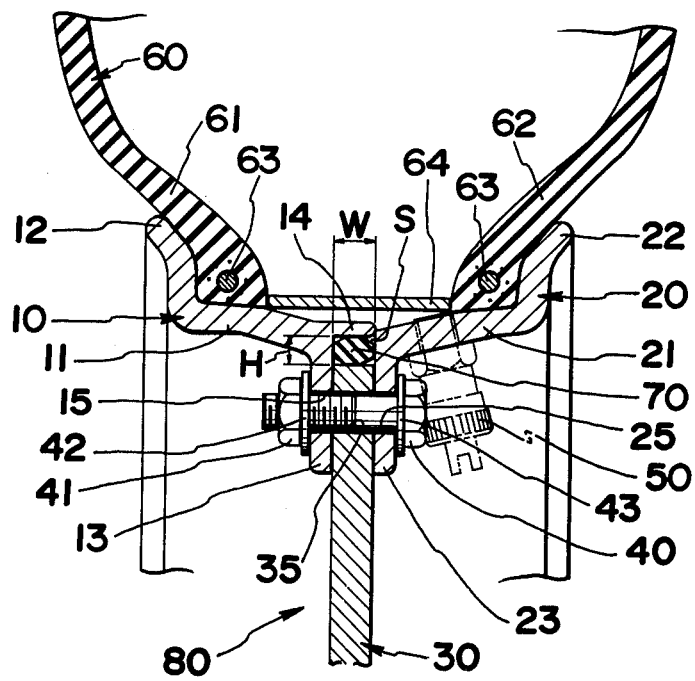
FIG. 1 is a vertically sectioned elevation of a wheel showing a connecting part of a rim and disc, illustrating only essential parts.

As shown in FIG. 1, a wheel 80 consists of a disc 30 and two split rim members 10 and 20 which are split on the left and right respectively in the direction of the axle.

The pair of split rim members 10 and 20 are provided with ears 12 and 22, respectively, to receive left and right bead parts 61 and 62 of a tire 60 rising from the outer periphery. Base pieces 11 and 21 are integral with the ears, are bent in the horizontal direction from the base parts of the ears, and extend symmetrically inwardly so as to approach each other in the horizontal direction. Jointing pieces 13 and 23 symmetrically vertically project toward the inner periphery from the opposed inner ends of said base pieces 11 and 21 and are formed to be truly circular ring-shaped. A piece 14, projecting in the direction of the axle, is formed in the outer peripheral part of the inner end of the base piece 11 of one of the split rim members, for example, the member 10 on the left side in the drawing in FIG. 1. This projecting piece 14 is provided integrally over the entire periphery and is so set that, when the split rim members 10 and 20 are integrally assembled together to hold the disc 30 in its peripheral side part, the tip of the projecting piece 14 may contact the part toward the outer periphery of the inner end of the base piece 21 of the member 20 on the other side.

The thus formed split rim members 10 and 20 hold the disc 30 on both sides of its peripheral side part with the jointing pieces 13 and 23, and have bolts 40 inserted through fitting holes 15, 25 and 35 made in the parts toward the outer peripheries of the jointing pieces 13 and 23 and disc 30, respectively. Nuts 41 are fastened in the direction of the axle. The member 10 and 20 are thus made integral with the disc 30, and have a tubeless tire 60 assembled to them to form a wheel 80. Washers 42 and 43 are interposed respectively between the nut 41 and the jointing piece 13, and between the head of the bolt 40 and the jointing piece 23.

The outside diameter of the disc 30 and the fitting of the split rim members 10 and 20 to the disc 30 are so dimensioned, shaped and oriented that a space S may be formed between the outer periphery of the disc 30 and the inner peripheral surface of the projecting piece 14 of the split rim member 10. The space S has a height H and a width W determined in the direction of the axle by the opposed end surfaces of the jointing pieces 13 and 23, and is formed to be ring-shaped over the entire periphery between the outer periphery of the disc 30 and the inner periphery of the projecting piece 14 of the rim.

Figure 2:
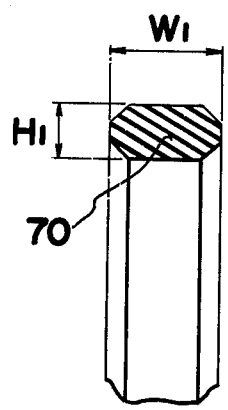
FIG. 2 is a vertically sectioned view of a sealing member.

In assembling the rim and the disc, a sealing member 70 as is shown in FIG. 2 is inserted in the thus formed space. The sealing member 70 is formed to be ring-shaped and of flexible elastic material, such as rubber. Its width $W_1$ is so set as to be larger than the width W of the space S, and its height $H_1$ is so set as to be substantially equal to the height H of the space S. As shown in the drawing, there is selected a cross-sectional shape which is chamfered in the corner parts so as to be easy to deform in the width direction and is projected on both sides in the width direction.

In assembling the wheel, this sealing member 70 is fitted in the shape of a ring to enclose the outer periphery of the disc 30. The left and right split rim members 10 and 20 are integrally assembled to the disc 30 by the bolts 40 and nuts 41 so that the sealing member 70 may be inserted and fitted in the space S.

Thus, the sealing member 70 will be regulated above and below by the outer periphery of the disc 30 and the projecting piece 14, and in the width direction by the opposed inner end walls of the base pieces 11 and 21 of the split rim members. Because the width $W_1$ of the sealing member 70 is so set as to be larger than the width W of the space S, when the split rim members 10 and 20 are fastened in the direction of the axle, the sealing member 70 will be elastically deformed within this space S to be in close contact with the peripheral walls and to maintain the airtightness. Therefore, the high pressure air within the tire 60 will be sealed by the jointing parts of the rim and disc and, in this sealing, a high airtightness will be maintained by the elastically deforming pressing contacting action of the sealing member as memtioned above.

In FIG. 1: the reference numeral 50 indicates an air valve to inject high pressure air into the tubeless tire 60; 63 indicates a reinforcing wire embedded in the bead parts 61 and 62 of the tire 60; and 64 indicates a spacer interposed between the bead parts 61 and 62.

In the above first embodiment, the split rim members 10 and 20 are connected with the disc 30 by bolts 40 and nuts 41. However, FIGS. 3 and 4 show an embodiment wherein one of the split rim members is assembled with the disc in advance so as to improve the workability.

In FIGS. 3 and 4, a disc 130 is integrally riveted in its peripheral side part with a jointing piece 113 of a first split rim member 110 in advance through calked type nuts 141 to leave a clearance for a space between a projecting piece 114 and the outer periphery of the disc 130. Thereby, as shown in FIG. 4, a ring-shaped groove $S_1$ opened on the side will be formed in advance between the disc 130 and the projecting piece 114 of the split rim member 110 integrally riveted to the disc. A ring-shaped sealing member 170 is fitted and inserted securely in groove $S_1$, the other or second split rim member 120 is applied so as to close the groove $S_1$ on the open side, and the bolts 140 are screwed into the nuts 141 as shown in FIG. 3. Thus, the disc 130 and the jointing piece 123 of the split rim member 120 may be integrally screwed and fastened together, and the three components may be combined together with the sealing member 170 fitted and inserted.

According to this, as compared with the first embodiment, the sealing member as well as the assembly operations can be simplified.

Thus, in the second embodiment, there is assembly in advance by using calked type nuts. However, it is also possible to assemble the disc with one split rim member in advance by the use of rivets or bolts.

In the above second embodiment, the projecting pieces 114 and 124 of the split rim members 110 and 120 are provided to project symmetrically on the inner end surfaces of the jointing pieces 113 and 123, respectively, and are butted against each other in the center position of the thickness of the disc 130.

FIG. 5 shows an embodiment wherein the disc is split on the right and left in the direction of the axle. In this embodiment, the split pieces or plates 231 and 232 of the disc 230 on the left and right in the direction of the axle are made flat in their peripheral side parts so as to be butted, and are symmetrically expanded in the central parts to improve the design. The split pieces 231 and 232 are butted against each other in the outer peripheral parts. The respective jointing pieces 213 and 223 of the split rim members 210 and 220 are formed in the same manner as is mentioned above, are joined with said split pieces of the disc from outside, and are screwed and fastened in the direction of the axle by bolts 240 and nuts 241. A sealing member 270 is inserted in the space between a projecting piece 214 and the outer peripheral edges of the assembled split disc pieces 231 and 232 to seal them.

Thus the present invention can be applied also to the wheel of the split disc type.

The respective embodiments illustrated in the above have been explained in detail. As evident from this, the projecting piece may be integrally shaped in shaping the rim, without requiring such special mechanical work as forming a groove in the split rim member.

Further, in the illustrations, the disc is shown to be of a solid plate material. But holes passing through the right and left sides of the disc may be properly made in consideration of the design, weight reduction, and side pressure by sidewise wind, especially for autobycles or motorcycles.

I claim:

1. A structure for sealing split rim type wheels, comprising:
   at least one wheel disc;
   a first split rim member provided with an integral jointing piece, said jointing piece having a face thereof butted against a first side face of said wheel disc adjacent the outer periphery of said disc, and being integrally secured to said disc;

said first split rim member being provided with a projecting piece extending substantially perpendicular to the plane of rotation of said disc;

an annular groove, opened substantially on one side only, being formed on the outer periphery of said disc between the outer peripheral edge of said disc, the butted face of said jointing piece, and said projecting piece;

an elastically deformable sealing member substantially securely disposed within said groove;

a second split rim member provided with an integral jointing piece, said jointing piece of said second split rim being adapted to have a face thereof butted against a second side face of said disc opposite to said first side face of said disc, and adjacent the outer periphery of said wheel disc such that:

said disc is held in its peripheral side parts with said first and second split rim members; and said annular groove is closed on said one opened side thereof by the butted face of said jointing piece of said second split rim member so as to compressibly and fixedly confine said sealing member within said annular groove.

2. A structure according to claim 1, wherein:

said sealing member has a dimension which is substantially perpendicular to the plane of rotation of said wheel disc, which dimension is larger than the corresponding dimension of said groove.

3. A structure according to claim 1, wherein:

said second split rim member is provided with a projecting piece extending substantially perpendicular to the plane of rotation of said disc and extending and projecting to face said projecting piece of said first split rim member such that said projecting pieces together form one side of said groove.

4. A structure according to claim 1, wherein:

said annular groove is substantially rectangular in cross section.

* * * * *